Aug. 8, 1933.  G. LOENING  1,921,992
AIRCRAFT
Filed Feb. 29, 1932  4 Sheets-Sheet 1

Aug. 8, 1933.    G. LOENING    1,921,992
AIRCRAFT
Filed Feb. 29, 1932    4 Sheets-Sheet 2

INVENTOR
Grover Loening
BY
ATTORNEY

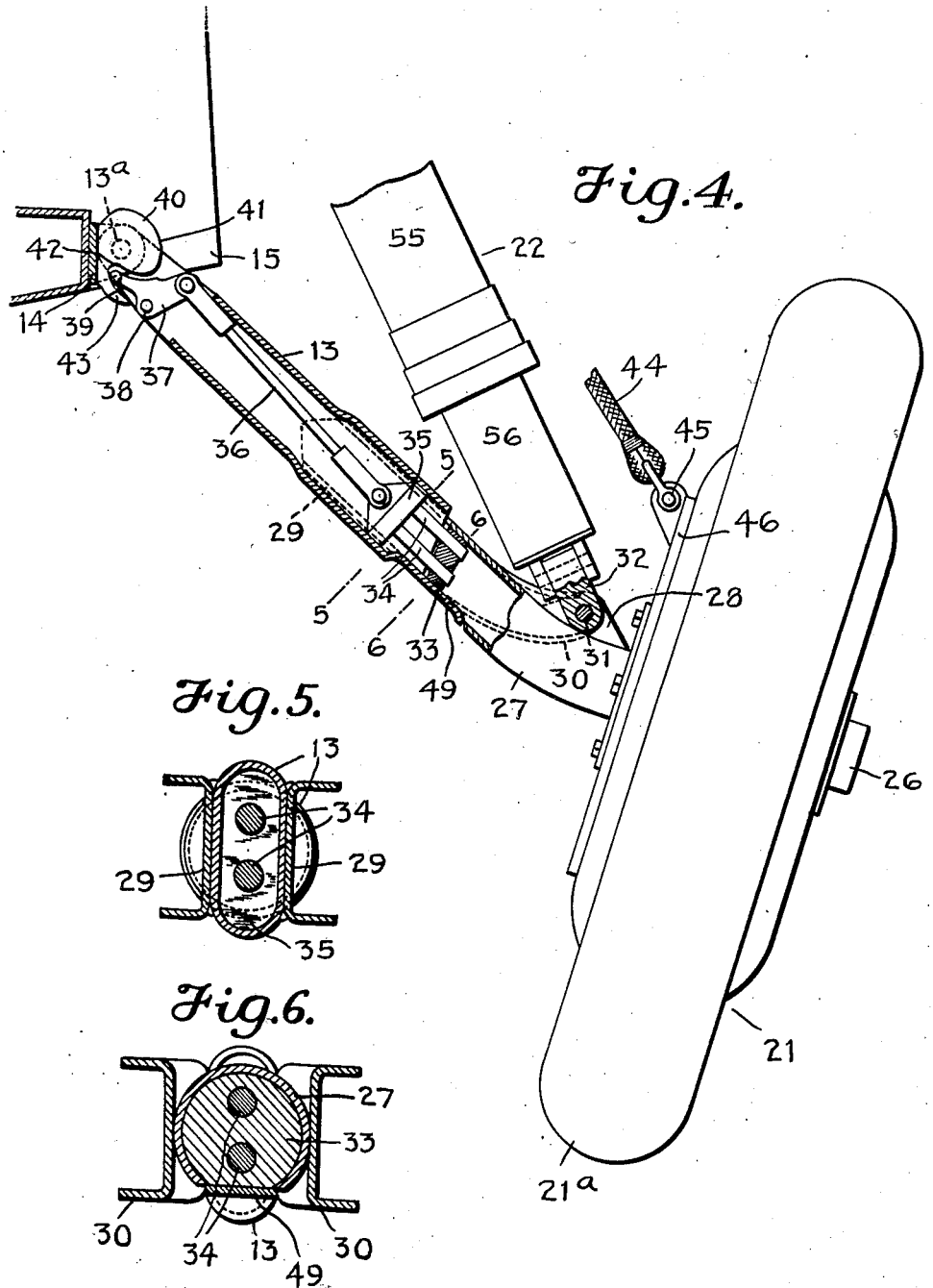

Aug. 8, 1933.　　　　　G. LOENING　　　　　1,921,992
AIRCRAFT
Filed Feb. 29, 1932　　　4 Sheets-Sheet 4

INVENTOR
Grover Loening
BY
ATTORNEY

Patented Aug. 8, 1933

1,921,992

UNITED STATES PATENT OFFICE 1,921,992

AIRCRAFT

Grover Loening, Mill Neck, Long Island, N. Y., assignor to Grover Loening Aircraft Company, Inc., Garden City, Long Island, a Corporation of New York Application February 29, 1932. Serial No. 595,796

15 Claims. (Cl. 244—2)

The invention relates to aircraft and more especially to those of the heavier-than-air class, and it relates specifically to the landing gear.

The landing gear is shown applied to a machine of the tractor amphibian class. This amphibian machine has a hull slung below the wing and the engine, which is at the center of the wing, an enclosed cabin under the engine, with the pilot's place in the forward part of the cabin, and a retractable landing gear that will clear the inside of the hull at the region under the engine, so that the pilot can be placed there. Advantages are that the pilot has full visibility forward, and is in a favorable position to manage mooring and anchorage without leaving his seat, and that a closer longitudinal grouping of weights is made possible. It will be understood, however, that the invention is applicable to practically any form of aircraft.

An object of the invention is to provide a simple, compact, easily operated, and reliable landing gear, which enables the wheels to be folded flat against the sides of the body or into shallow external pockets, and the construction of which is such that it leaves unobstructed a portion of the interior where it is very advantageous for the pilot to be, or where gasoline, passengers or other load may be disposed.

Each half of the landing gear comprises a plurality of flexibly connected parts, so related that the wheel can be drawn up and in, to a position alongside the body, and is further characterized by the provision of a lock which locks one part to another when the landing gear is lowered and releases it when the landing gear is raised.

Other features of the invention will become apparent from the following description of the preferred embodiment.

In the accompanying drawings forming part hereof:

Fig. 4 is a fragmentary view on a still larger scale, corresponding to Fig. 2 and showing parts of the landing gear in section.

Figs. 5 and 6 are cross-sections on the lines 5—5 and 6—6, respectively, of Fig. 4.

Figure 7:
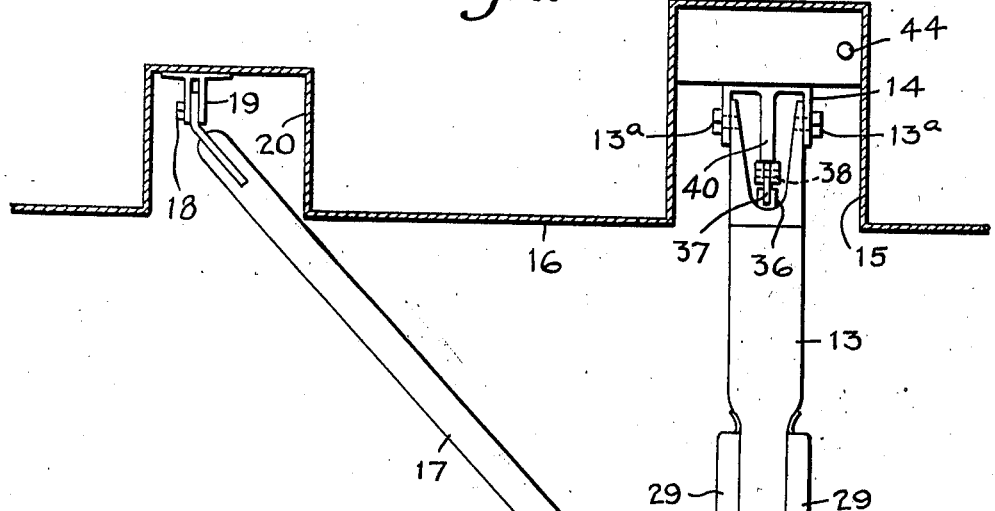

Fig. 7 is a sectional plan view of the same half of the landing gear, with the wheel omitted and the axle broken away.

Figure 1:
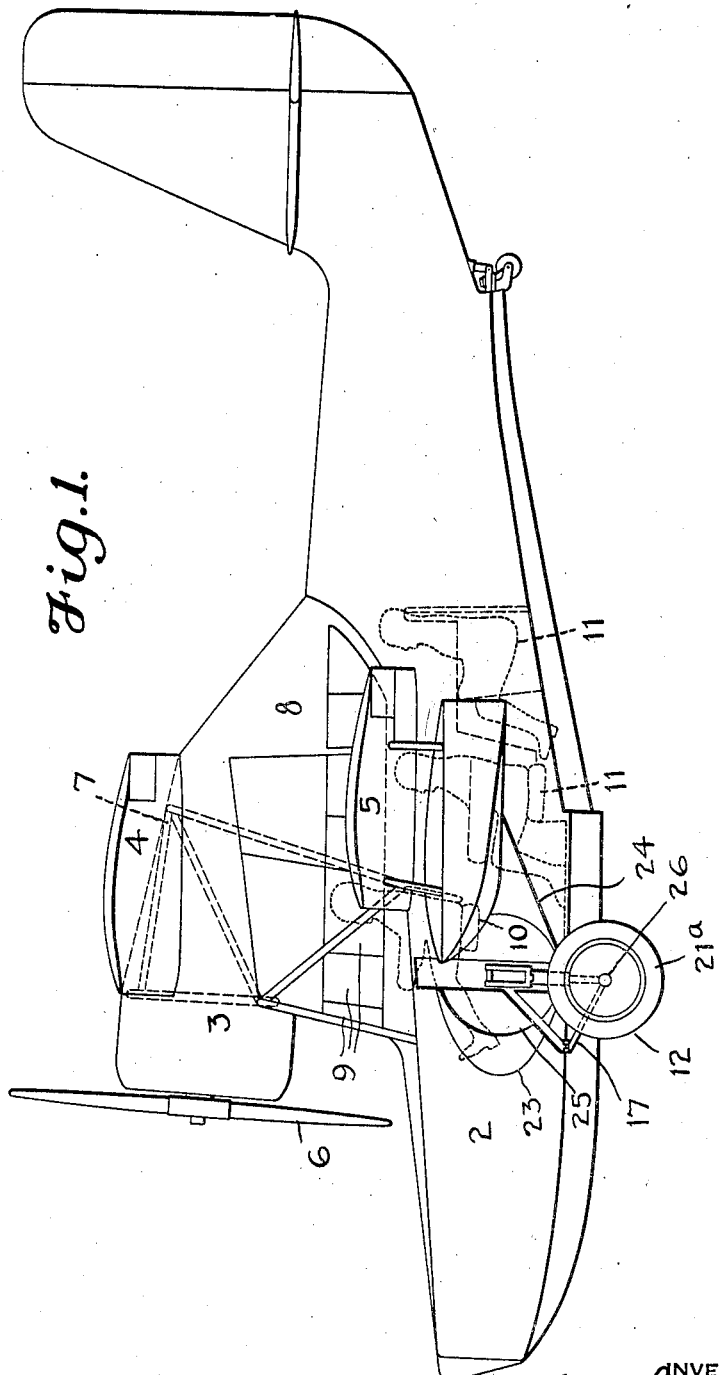
Fig. 1 is a side elevation of an amphibian flying-boat constructed in accordance with the invention and provided with the novel landing gear.
Figure 8:
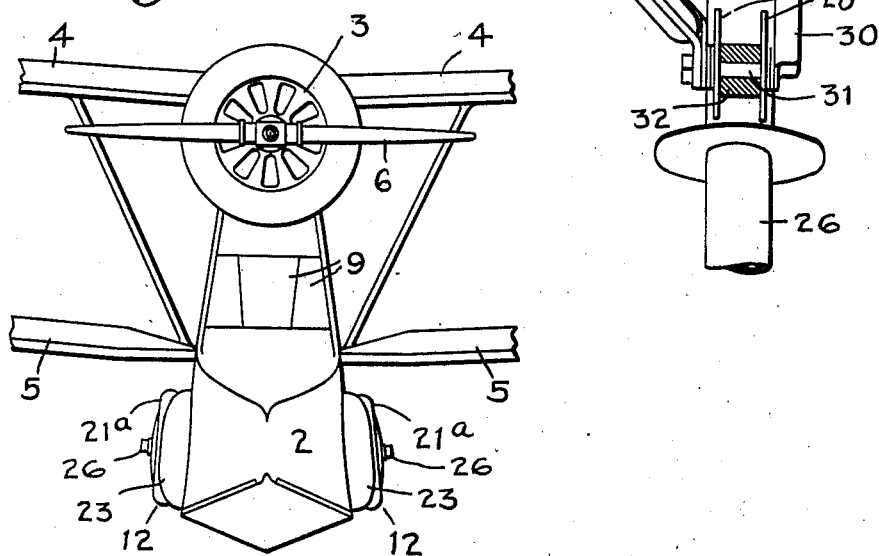

Fig. 8 is a front elevation of the amphibian machine of Fig. 1, with the landing gear, the wings being broken away.

The amphibian machine of my present invention is shown as a whole in Figs. 1 and 8. The hull body 2 is suspended below the engine 3 and the upper wing 4. Lower wings 5 are attached to the sides of the body, the bracing between the wings being omitted for clearness of illustration.

The forwardly-located engine, driving the propeller 6, is at the center section of the upper wing and preferably beneath it. The wing-and-engine center section, on the one hand, and the hull, on the other hand, are interconnected by a system of structural members 7 so organized that the one structure serves for overhead support of the engine and upper wing, as a unit, and for suspension of the hull.

The space between the wing and engine unit and the hull is totally enclosed by a stream-line cabin enclosure 8 having windows 9 in front and at the sides. The members 7 of the connecting structure are so disposed as to leave the interior of the cabin free for occupancy or for stowing load.

The pilot's place 10 is preferably in the hull, and within the forward portion of the cabin, approximately below the engine. Behind him, and under the head-room of the cabin enclosure one or more places 11 for passengers are provided.

A retractable landing gear 12 is applied to the sides of the hull at the region below the engine. The construction of this landing gear, which will be described in detail as the specification proceeds, permits the pilot to sit between the halves of the landing gear, or if the pilot should be placed elsewhere, makes this portion of the hull available for carrying other cargo. The ability to use this portion of the interior of the body for such purposes, and more especially for the pilot's position, is an important advantage.

One half of the landing gear is shown in detail in Figs. 2-6. Since the two halves are duplicates, it will be sufficient to describe one of them.

A radius arm 13 is hinged at 13ª to a fitting 14 fixed in the lower end of a vertical channel 15 recesesd in the side 16 of the body. This arm can therefore swing in a vertical transverse arc. Naturally, the arm need not consist of a single member, since, as shown, it is stayed by a diagonal forward rod 17, which is hinged at 18 to a fitting 19 at the lower end of an inclined channel 20, also recessed into the side of the body.

The outer end of the arm 13, which is preferably hollow, is connected with the wheel unit 21, and the wheel unit and radius arm are connected with a strut 22, which, in the protracted condition of the landing gear, extends diagonally upward and inward to a point of support in the channel 15. The three main parts, namely, the radius arm, the wheel unit and the strut, are all flexibly connected or associated with each other, so that the radius arm and the strut can both move angularly in relation to the wheel unit when the wheel is raised and lowered, thereby making it possible for the wheel 21ª to be placed close alongside the body, in a substantially vertical position, when the landing gear is raised.

Stream-line fairings 23, 24 are preferably applied to the outside of the body, before and behind the raised position of the wheel, these fairings being cut-away circularly to form an external pocket 25 into which the wheel can be partly or entirely absorbed.

In order to enable the wheel of such a totally flexibly landing gear to sustain the machine on the ground, a lock is provided for making the wheel unit firm with the other parts, when the landing gear is lowered. This feature of the invention may be carried into execution in specifically different ways, and in the broader aspect the lock may act between the wheel unit and either or both of the other parts. However, the most practical and advantageous construction is one that locks the wheel unit to the radius arm.

In the illustrated embodiment, the axle 26 of the wheel has a stub 27 having top ears 28, by which the wheel unit is pivoted to the outer end of the radius arm and also to the lower end of the strut 22, this pivotal connection also permitting the strut and radius arm to move angularly in relation to each other when the landing gear is raised or lowered. The radius arm preferably has a bifurcated extension formed by two channel plates 29 welded to the sides of the arm and projecting outwardly from it somewhat like a pair of horns 30. A pivot pin 31 passes through the ends of these horns, the ears 28 and the lower end 32 of the strut. The same pin may also serve as the connection for the outer end of the stay rod 17.

The stub axle 27 extends beyond the pivot connection 31 and between the horns 30, by which it is laterally supported. A plug 33 fixed in the inner end of the stub is perforated to receive locking pins 34 projecting from a block 35 slidably guided inside the radius arm. This block is connected by a pivotal link 36 with a bell-crank lever 37, which is pivoted at 38 to the inner portion of the radius arm. The end 39 of the other arm of this lever coacts with the periphery of a cam 40, rigid with the fitting 14. This cam has a high portion 41, a low portion or recess 42, and a confronting portion 43.

Figures 2, 3:
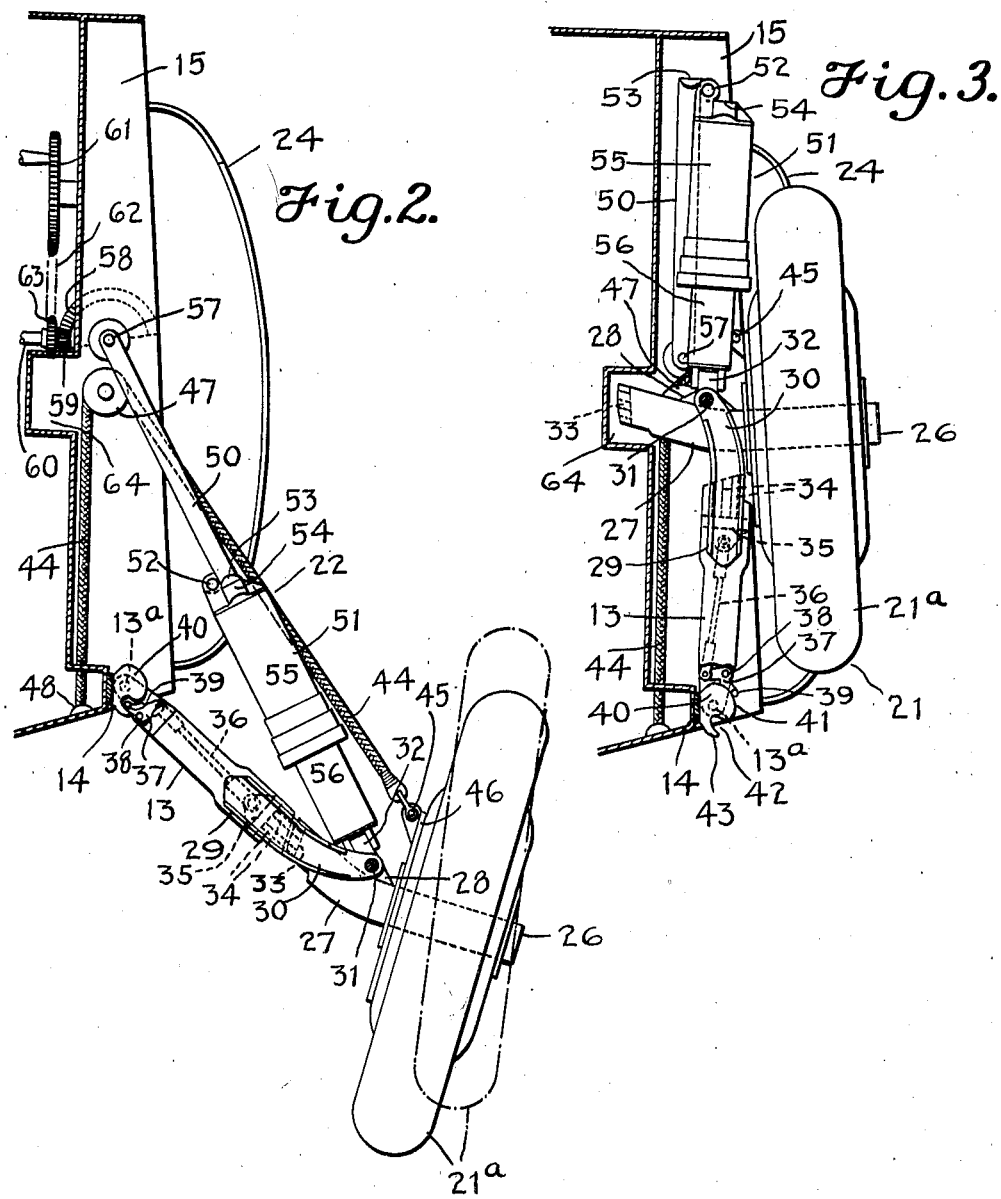
Fig. 2 is a sectional front elevation on a larger scale, showing one half of the landing gear, as preferably constructed, in the lowered or protected condition. The broken lines show the position which the wheel assumes when the shock-absorber yields on alighting, the positions of other parts corresponding to this condition not being indicated.
Fig. 3 is a sectional front elevation showing the same half of the landing gear retracted or folded.

The construction is such that when the landing gear is raised and by that operation the radius rod is swung upward, the cam follower rides up the steep edge of the cam, out of the recess onto the high part 41, and in so doing rocks the lever 37, to draw back the link 36 and the block 35, thereby withdrawing the locking pins from the keeper end of the stub axle. This frees the wheel unit, so that it is no longer compelled to keep its angular relation to the radius arm, which, if it did, would result in the wheel coming edge first against the side of the body. On the contrary, the wheel is drawn flat against or into the side of the body, the unlocked joint between the stub axle and the radius arm being then dislocated at approximately right angles, as shown in Fig. 3, the arm being upright and the wheel axle approximately horizontal.

When the landing gear is lowered, the follower 39 eventually comes over the recess of the cam and then encounters the confronting portion 43, the reaction of which forces the follower into the recess, thereby rocking the lever 37 in the contrary direction and positively projecting the lock to engage the stub axle.

In order, at this time, to bring the lock-engaging portion of the wheel unit into registry with the lock, or in other words to re-locate the coacting elements of the lockable joint, a resilient or yielding means is provided, together with some abutment or locating stop. The form and arrangement of these and other provisions may be widely varied. Preferably an elastic cable 44 is connected at 45 to a non-rotary part 46 of the wheel structure, this cable passing under tension, upward over a pulley 47 and downward to an anchorage 48. As the landing gear is lowered this cable tends to keep the wheel more or less upright and its axle more or less horizontal, while the radius arm swings downward to the position in which it alines with the axle stub. While the lock is still retracted, the axle stub encounters a locating stop 49 projecting from the radius arm, and the tension of the elastic holds the stub against this stop, and between the embrace of the horns 30, causing the axle to be alined exactly with the locking elements 34. Substantially at this moment, the reaction of the cam 40 actuates the lock to engage the axle of the wheel unit, the landing gear being then ready to make a landing.

The elastic cable also serves to counterbalance the weight of the landing gear, to equalize, more or less, the effort required to raise and lower it.

Various means may be employed for raising and lowering the landing gear, and for sustaining it in the protracted condition against swinging freely about the pivot 13ª. A movable strut is the most advantageous means to use for these purposes, and more especially a folding or toggle strut embodying features covered in my Patent No. 1,759,652, dated May 20, 1930. Such a strut enters into a novel combination in the present landing gear.

In the preferred embodiment, therefore, the strut 22 consists of upper and lower sections 50 and 51, which are connected by an offset hinge 52 and which have abutting ends 53 and 54 coacting in the line of thrust to take the stress of landing, the strut being then straightened as shown in Figs. 2 an. 4.

The lower section of the strut contains, or is constituted by, a shock-absorber, the relatively movable parts of which are marked 55 and 56.

The upper section 50 of the strut is pivoted at 57 to the body of the plane, so as to swing in an arc. A simple and compact mechanism for swinging the section 50, to raise or lower the landing gear, comprises toothed gearing, including a segment 58 fixed to the shaft or pivot 57, which passes through a side wall of the channel 15 into the interior of the body, the segment being on the inside and being meshed by a pinion 59 on a shaft 60. This shaft can be turned from a manually operated sprocket wheel 61 through a chain 62 passing over a sprocket pinion 63 on the shaft 60.

It will be understood that the two halves of the landing gear, at the opposite sides of the body, may be operated simultaneously. For this purpose the shaft 60 may be extended across the interior to the opposite side, where it may carry another pinion to mesh another segment like the segment 58.

When the landing gear is raised the toggle strut 22 is broken and the section 50 is swung from the downwardly and outwardly inclined landing position of Figs. 2 and 4 to the approximately upright position of Fig. 3. In this condition, the lower section 51 of the strut hangs substantially straight down, above the upstanding radius arm 13, all of these parts being compactly disposed in the channel 13. A small pocket 64 in the back of the channel accommodates the end of the stub axle 27.

When the landing gear is lowered, and the strut 22 is straight, the triangle formed by the radius arm, the strut and the side of the body is solid except for the desired degree of yielding afforded by the shock-absorber, but the wheel unit would be free to swing laterally on the pivot 31, except as it might be stopped in one direction by the positioning abutment 49 or some stronger stop that might be provided. The function of the automatic lock, which fixes the wheel unit to one of the members of the triangle, when the landing gear is lowered, and which frees the wheel unit when the gear is raised, is, therefore, important.

While the preferred construction and arrangement of the landing gear have been described in detail, it will be understood that numerous changes can be made without departing from the scope of the invention, and it is accordingly desired that the matters shown in the drawings and described herein be taken in an illustrative rather than in a limiting sense.

I claim:

1. In an aircraft having a body, a landing gear comprising a swinging radius arm extending outward from said body in the landing position and extending upward in the raised position, a wheel unit confined by said radius arm to an arcuate path of movement about the pivot of said radius arm as a center, means for raising and lowering said radius arm and wheel unit, a dislocating joint between said arm and unit permitting the angular relation between the wheel and the radius arm to change when the wheel is raised, and a device for locking and unlocking said joint.

2. A landing gear comprising a swinging radius arm, a wheel unit, means for raising and lowering said radius arm and wheel unit, a pivot connection between said radius arm and wheel unit permitting the wheel to occupy an approximately vertical position when the radius arm is swung up, and a device to interlock the radius arm and the wheel unit against relative movement when the parts are lowered.

3. A landing gear comprising a swinging radius arm, a wheel unit, a movable strut through which said radius arm and wheel unit are raised and lowered, each of the three aforesaid parts being flexibly connected with the other two, and an automatic device for locking the wheel unit to one of the other parts.

4. A landing gear comprising a swinging radius arm, a wheel unit, a strut through which said radius arm and wheel unit are raised and lowered, each of the three aforesaid parts being flexibly connected with the other two, and means for locking together and unlocking two of the parts, said strut comprising an upper swinging section and a lower translational section flexibly jointed together.

5. A landing gear comprising a swinging radius arm, a wheel unit, a dislocating joint between said radius arm and wheel unit, automatic means for locking and unlocking said joint, a strut comprising a swinging upper section and a lower translational section flexibly connected and rigidly abutting, the lower of said sections being flexibly connected with the radius arm and the wheel unit, and operating means connected with the upper strut section to swing it and thereby raise and lower the parts.

6. A landing gear comprising a swinging radius arm, a wheel unit confined by said radius arm to an arcuate path of movement about the pivot of said radius arm as a center, a flexible connection between said arm and unit permitting the angular relation between the wheel and the radius arm to change when the wheel is raised, and an automatically actuated lock for locking and unlocking the radius arm and the wheel unit.

7. A landing gear comprising a swinging radius arm, a wheel unit flexibly associated with said radius arm, a lock for said arm and unit, and a cam controlling said lock.

8. A landing gear comprising a swinging radius arm, a wheel unit having an axle stub, a lock movable lengthwise of said radius arm to engage and disengage said axle stub, and automatic means for actuating said lock.

9. A landing gear comprising a swinging radius arm, a wheel unit in flexible relation to the radius arm, a lock on the radius arm to engage and disengage the wheel unit, and a cam having two portions to coact with the lock to effect its positive engagement with and disengagement from the wheel unit.

10. A landing gear comprising a plurality of flexibly connected parts, means for locking one of the parts to another, and a cam controlling said lock.

11. A landing gear comprising a swinging radius arm having lateral horns, a wheel unit having a stub axle between said horns, and a flexible raising and lowering strut pivotally connected with the horns and stub axle, a lock on the radius arm to engage the stub axle, and automatic means for actuating said lock.

12. A landing gear comprising a swinging radius arm, a wheel unit flexibly associated therewith, lateral horns and a stop on one part to coact with the other, and a lock on one part to engage with the other.

13. A landing gear comprising a plurality of flexibly connected parts, means for raising and lowering the same, an automatic lock between two of the parts, and yielding means for bringing said parts into relation to be locked when the parts are lowered.

14. A landing gear comprising a swinging radius arm, a wheel unit having a stub axle, and a flexible operating strut flexibly connected with said arm and unit, an automatic lock for interengaging the radius arm and stub axle, and means for disposing the wheel unit in position to be locked.

15. A retractable landing gear comprising the combination of a wheel unit, mechanism for raising and lowering and supporting the wheel unit in such manner that, in retraction, the wheel is drawn up and into a vertical position alongside the body to which the landing gear is attached, and a device for automatically locking the wheel unit to a part of said mechanism and for unlocking it therefrom, when the landing gear is lowered and raised, respectively.

GROVER LOENING.